United States Patent [19]
Randall et al.

[11] Patent Number: 5,462,226
[45] Date of Patent: Oct. 31, 1995

[54] TEMPERATURE-RESPONSIVE, LOCKING MECHANISM FOR, AND IN COMBINATION WITH, A FLUID VALVE

[75] Inventors: Richard D. Randall, York; Alan W. Bucher, Manheim, both of Pa.

[73] Assignee: ITT Corporation, New York, N.Y.

[21] Appl. No.: 334,903

[22] Filed: Nov. 7, 1994

[51] Int. Cl.⁶ ................................................. G05D 23/00
[52] U.S. Cl. ........................................ 236/93 R; 137/115
[58] Field of Search ............................. 251/115, 116; 137/383; 236/93 R, 93 B, DIG. 3

[56] References Cited

U.S. PATENT DOCUMENTS

| | | | |
|---|---|---|---|
| 562,410 | 6/1896 | Moon | 251/115 X |
| 585,383 | 6/1897 | Gold | 251/115 X |
| 915,706 | 3/1909 | Shackleton | 251/116 |
| 1,261,949 | 4/1918 | Lucas | 251/115 X |
| 1,875,857 | 9/1932 | Curff et al. | 137/383 X |

*Primary Examiner*—William E. Tapolcai
*Attorney, Agent, or Firm*—Menotti J. Lombardi

[57] ABSTRACT

A temperature-responsive, locking mechanism is provided for a valve which has a rotary operating assembly journaled in a housing. The mechanism comprises an annulus coupled to the assembly for rotation therewith. A fluid temperature-operated electric switch is external of and coupled to the housing. A solenoid is mounted in the housing. A source of electric power is connected to the switch and the solenoid. The switch ia coupled to the solenoid for effecting solenoid operation, and locking means, coupled to the solenoid, and in proximity to the solenoid is actuable in response to solenoid operation for engaging the annulus and preventing rotation of both the annulus and the assembly.

12 Claims, 4 Drawing Sheets

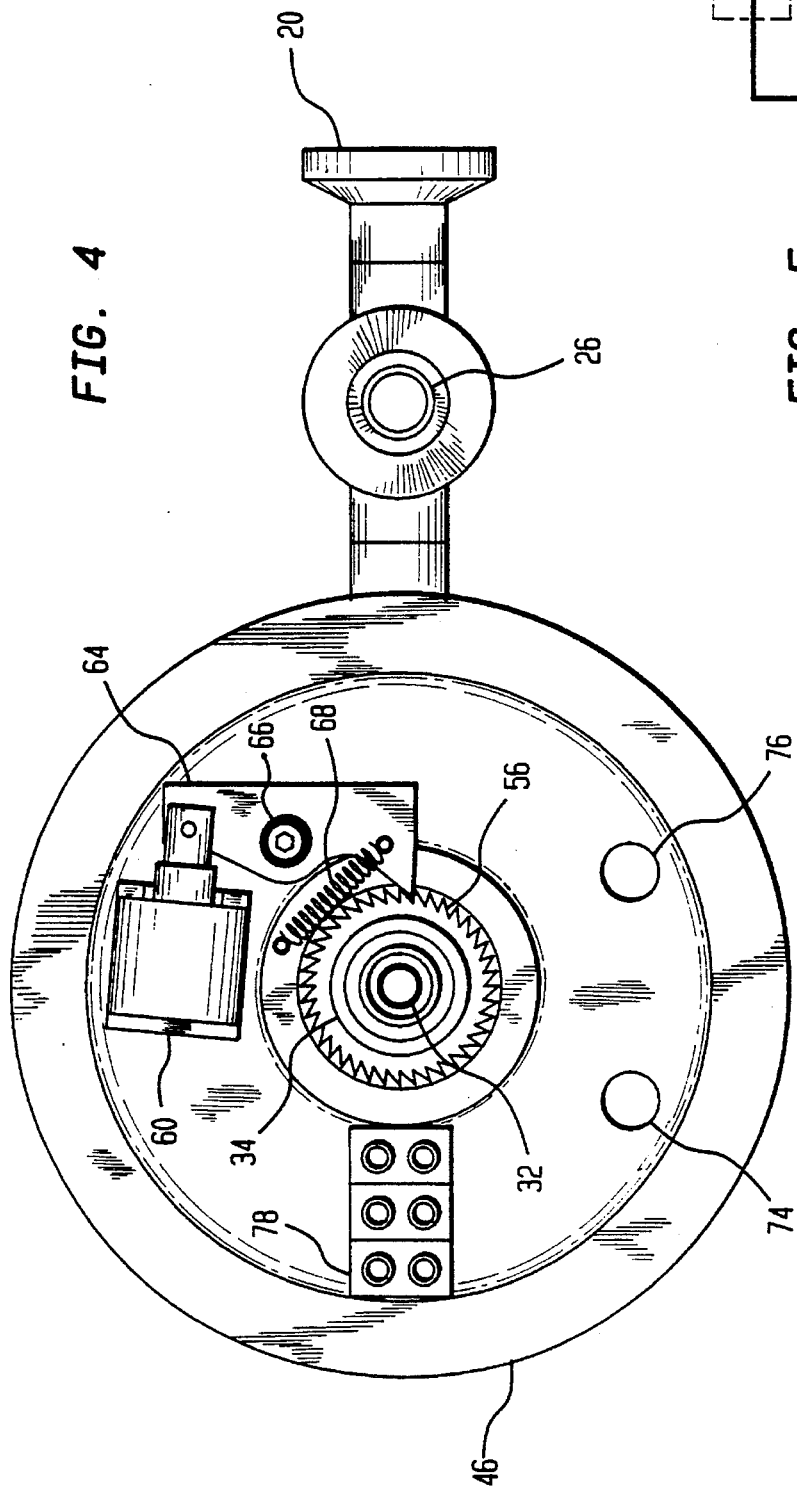

TEMPERATURE-RESPONSIVE, LOCKING MECHANISM FOR, AND IN COMBINATION WITH, A FLUID VALVE

BACKGROUND OF THE INVENTION

Valves, so-called point-of-use valves, used in pharmaceutical piping system applications are normally manual valves which are operated manually. Because the systems in which these valves are used are periodically sterilized with steam, there is a concern for the safety of personnel who operate these valves. It is possible that, inadvertently, one could open a valve during a steam sterilization cycle, resulting in an unexpected release of steam and possible personal injury. Normal courses of action to prevent the aforesaid are (a) to provide redundant, automatic valves which can be controlled, centrally, to close off the system upstream of the subject valve(s), (b) to provide visual, warning indicators, i.e., warning lights at or near the subject valves, or (c) to manually lock the valves prior to the steam cleaning process.

Use of redundant, automatic valves comprehends additional, expensive equipment, and would cause increased maintenance and servicing of the subject system. Warning lights, or such, are not fail safe; too, they can be overlooked or ignored. Manually locking of all the critical valves in a system would be unduly time-consuming, and subject to error.

This invention provides a novel alternative solution to the problem which obviates any need for redundant valves, does not rely on lights or other sensory indicators, and does not require personnel to correctly locate and lock out the relevant valves manually.

SUMMARY OF THE INVENTION

It is an object of this invention to disclose, for a valve which has a rotary, operating assembly journaled in a housing, a temperature-responsive, locking mechanism, comprising an annulus coupled to said assembly for rotation therewith; a fluid-temperature-operated, electric switch external of, and coupled to, said housing; a solenoid mounted in said housing; and a source of electric power connected to said switch and said solenoid; wherein said switch is coupled to said solenoid for effecting solenoid operation; and locking means, coupled to said solenoid, and in proximity to said annulus, actable in response to solenoid operation, for engaging said annulus and preventing rotation of both said annulus and said assembly.

Another object of this invention is to set forth a temperature-responsive, locking mechanism, for a valve which has a rotary, operating assembly, comprising an annulus for coupling thereof to said assembly for rotation therewith; a platform; a solenoid mounted to said platform; a fluid-temperature-operative, electric switch coupled to said solenoid for effecting solenoid operation; a source of electric power connected to said switch and to said solenoid; and locking means, coupled to said solenoid, and in proximity to said annulus, actable in response to solenoid operation, for engaging said annulus and preventing rotation of both said annulus and said assembly.

Further objects of this invention, as well as the novel features thereof, will become apparent by reference to the following description, taken in conjunction with the accompanying figures.

BRIEF DESCRIPTION OF THE DRAWINGS

FIG. 4 is a plan view of the locking mechanism housing, again with the cover removed; and FIG. 5 is a schematic diagram of the electrical circuitry.

DETAILED DESCRIPTION OF THE PREFERRED EMBODIMENT

Figure 1:
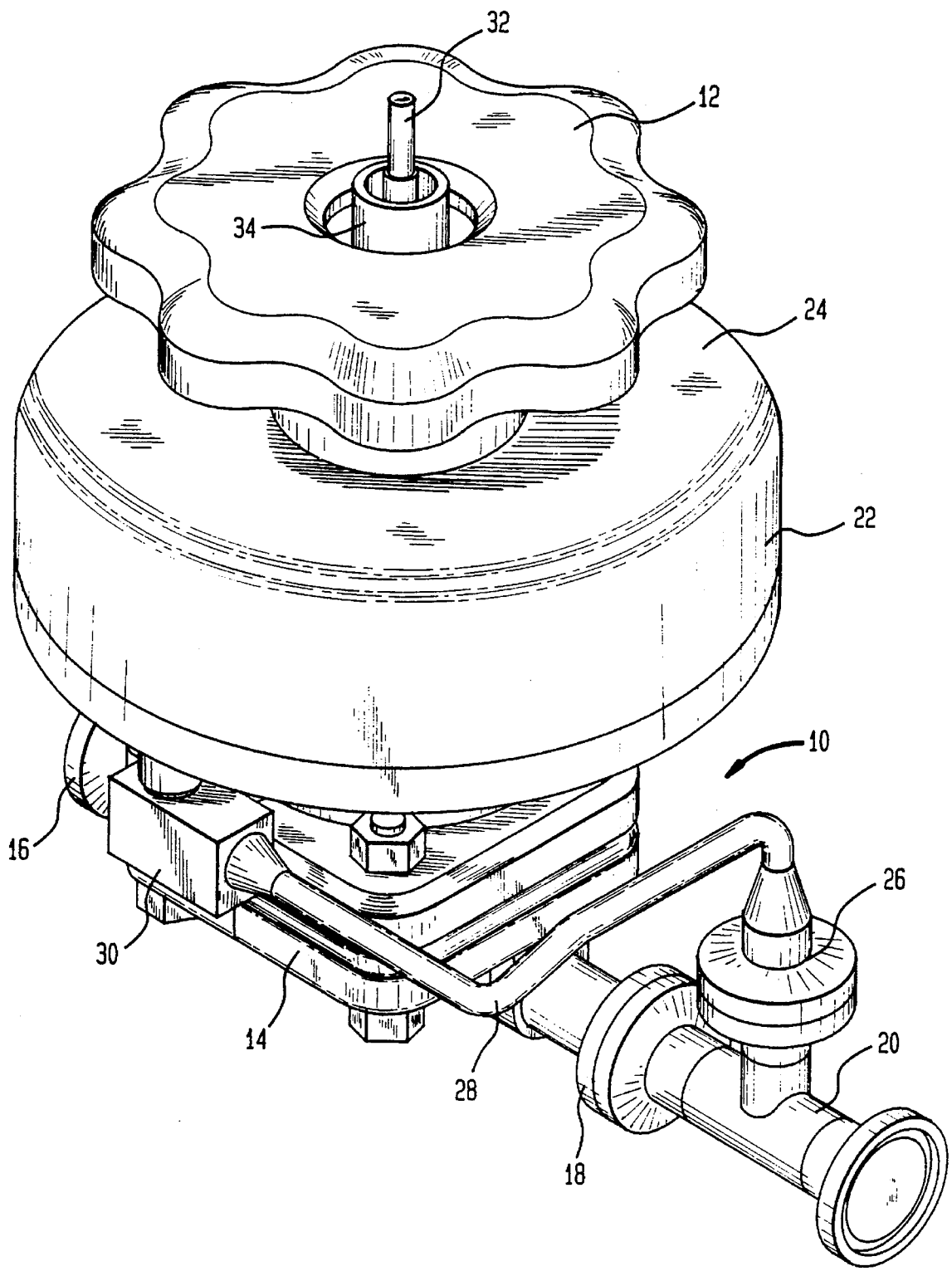
FIG. 1 is a perspective illustration of a handwheel-operative valve which incorporates an embodiment of the invention therein.

FIG. 1 illustrates a fluid control valve 10, operative by a handwheel 12, the valve 10 having a valve body 14, an outlet flange 16 and an inlet flange 18. A tee-shaped tube 20 is connected to the inlet flange 18. Between the body 14 and the handwheel 12 is a housing 22 in which are confined components of a temperature-responsive, locking mechanism 24. A fluid-temperature-operative switch 26 is mounted onto the tube 20 for actuation in response to a given temperature of fluid flow through the tube 20 and body 14. An electrical conduit 28 electrically connects the switch 26 to an electrical connector 30 provided therefor on the housing 22. An end of a spindle 32 projects from the handwheel 12, and a portion of a spindle-enclosing bushing 34 is shown circumjacent the spindle 32.

Figure 2:
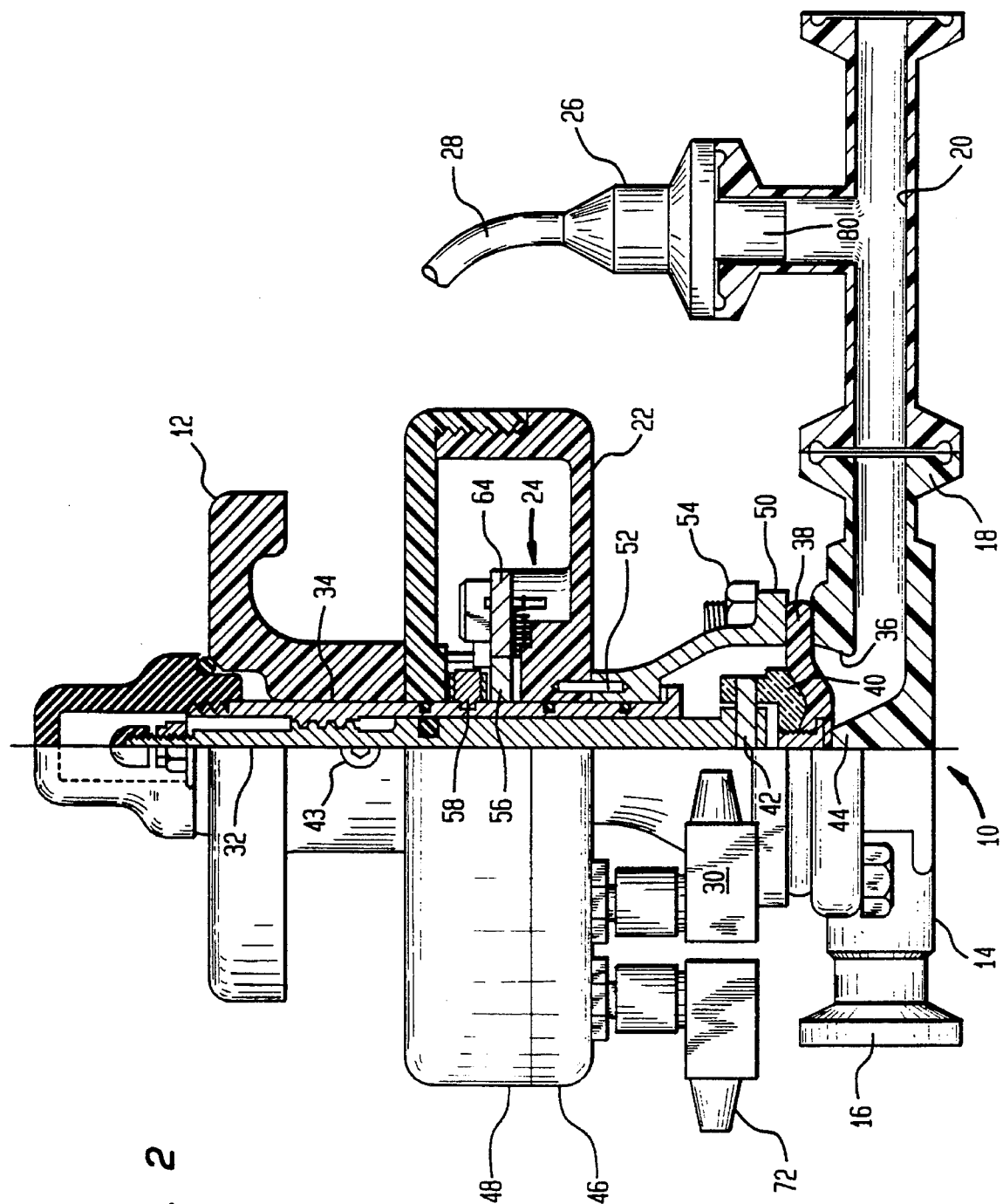
FIG. 2 is an elevational view of the valve of FIG. 1, half of the illustration being axially cross-sectioned.

The cross-sectional view in FIG. 2 shows the body 14 to have an opening 36 formed therein and, as shown, the opening is closed off by a flexible diaphragm 38. The diaphragm 38 is held against the opening by a compressor 40. A pin 42 fixes the compressor 40 to the spindle 32 An upper end of the spindle 32 is externally threaded and, thereat, threadedly engages internal threads formed on the bushing 34. A set screw 43, in penetration of the handwheel 12, fixes the handwheel to the bushing 34. Consequently, with rotation of the handwheel 12, the spindle 32 is caused to translate, and move the compressor 40 and the there-attached diaphragm 38 from or toward the opening 36. Within the opening 36 is a weir 44. The diaphragm 38, upon having closed against the weir 44, prevents fluid flow through the body 14. The diaphragm 38 must be removed from the weir 44 before flow can pass through the tube 20 and the body 14, and out the opposite end of the body, i.e., via outlet flange 16.

The housing 22 has a base 46 which serves as a platform for components of the locking mechanism 24, and a cover 48. The housing is joined to the bonnet 50 by means of three pins 52 (only one of which is visible), and the bonnet 50 is fastened to the body 14 by hardware 54.

Figure 3:
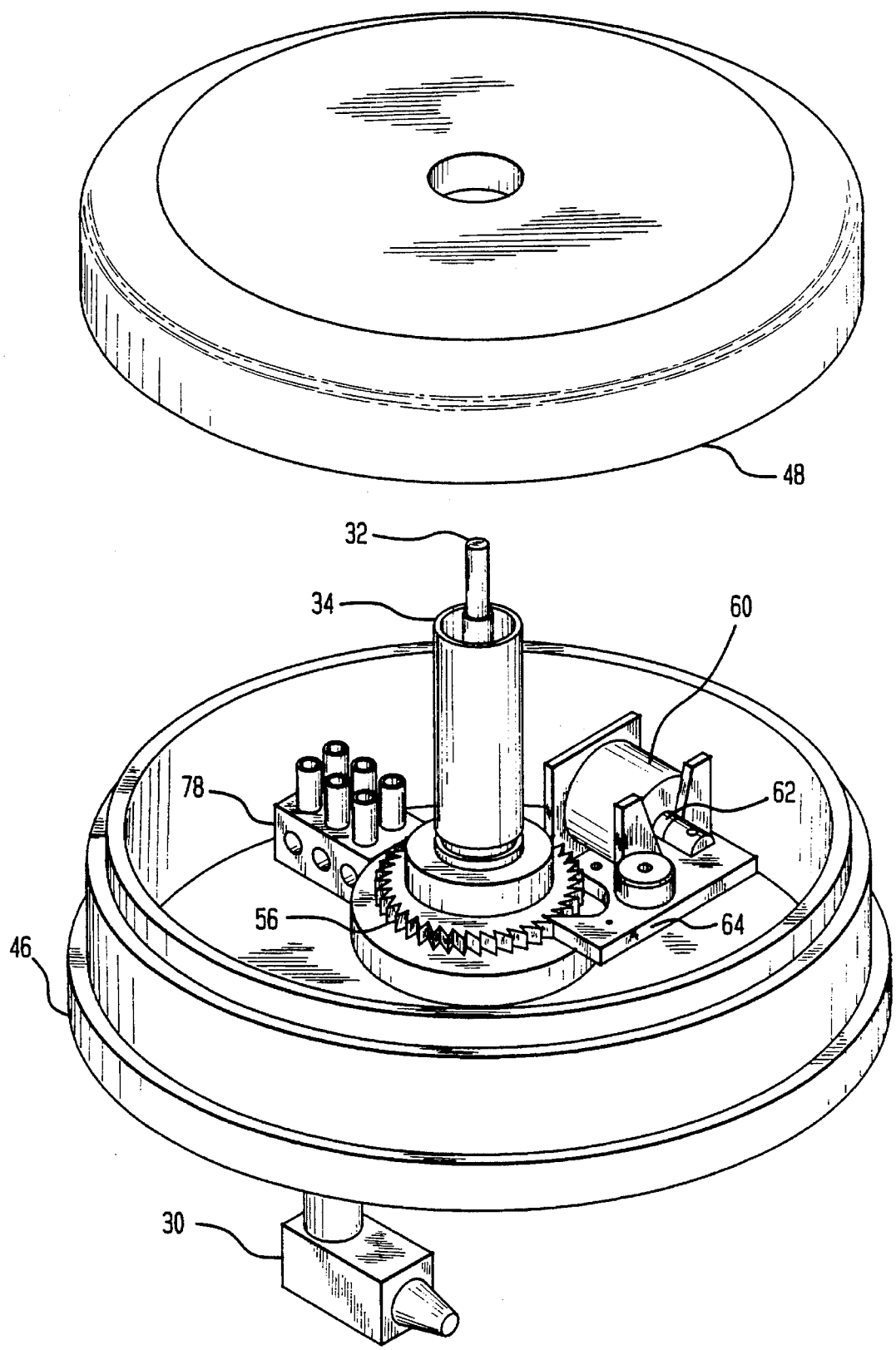
FIG. 3 is a perspective depiction of the locking mechanism housing, the housing cover being shown detached and in elevation therefrom.

FIGS. 3 and 4 better illustrate the housing-confined components of the locking mechanism 24. Therein it can be seen that an annular ratchet 56 is set about the bushing 34 and secured thereto by a set screw 58 (shown in FIG. 2). Mounted on the base 46 is a solenoid 60. The stroking rod 62 of the solenoid 60 is pivotably coupled to one end of a pawl 64. The pawl 64 is pivotably mounted to the base 46 by a shoulder bolt 66. An extension spring 68, fixed at one end to the base 46, and to the pawl 64 at the other end thereof, urges the pawl into engagement with the ratchet 56.

As represented in FIG. 5, a source 70 of electrical power is connected to the solenoid 60 and to the switch 26. The power connection to the solenoid 60 is by an electrical conduit (not shown) which couples to another electrical connector 72 fixed to the housing 22. Holes 74 and 76, in the base 46, admit therethrough the power conduit from the source 70 and the conduit 28 from the switch 26, respectively. Too, a terminal strip 78 mounted to the base 46 is provided to enable and connect the circuitry of FIG. 5.

The temperature switch 26 is normally closed and, consequently, the solenoid 60 is normally energized. Therefore, the pawl 64 is normally withdrawn from the ratchet 56, and the valve 10 is unlocked. One can use the handwheel 12 to open or close the valve 10 at will. The switch 26 has a temperature-sensing probe 80 which is exposed to the subject fluid in the tee-shaped tube 20. When the probe 80 reaches a set temperature, the switch 26 opens. In an embodiment of the invention, the switch opens within approximately fifteen seconds of the probe being exposed to process fluid, steam, or the like of the set temperature. The switch setpoint is factory-set and can be uniquely determined for each application. The setpoint must be larger than the maxim temperature of the normally-processed fluid, and less than the steam temperature. The setpoint is made as close to the maximum temperature of the normally processed fluid without causing a false tripping to occur. A larger difference between the setpoint of the switch 26 and the steam temperature will result in a shorter response time. The switch 26 can also be set to prevent opening of the valve 10, i.e. to lock the valve, for a given level of process fluid temperature, but the response time may be longer in such circumstances. In this embodiment of the invention, the accuracy of the switch setpoint is plus or minus five degrees Fahrenheit.

As explained, then, the switch 26 opens when the probe 80 thereof is exposed to the setpoint temperature. Resultantly, the solenoid 60 becomes de-energized. The solenoid rod 62 advances and, with the urging of the spring 68, the pawl 64 pivots into the ratchet 56. The valve 10, then, is locked. It can be closed, but it cannot be opened. The locked condition of the valve 10 is depicted in FIGS. 3 and 4.

Two events cause the solenoid 60 to de-energize and the valve 10 to lock: the temperature switch 26 opens as a result of the fluid in the through conduitry reaching the setpoint temperature of the switch 26, and electrical power to the valve is interrupted or lost.

The bias of the spring 68, the normally-closed condition of the switch 26, and the "pull-when-energized" dispostion of the solenoid 60 insure that the valve 10 will fail safe, which is the locked condition. In this disclosed embodiment, and by virtue of the ratchet direction thereof, the valve 10 can always be closed, whether the valve is locked or unlocked. The novel locking feature affects only the ability to open the valve 10. The failure mode can be reversed by changing the combination of: the spring 68 bias, the solenoid action, and the default state of the switch 26.

The preferred embodiment depicted is temperature-responsive, as explained. Of course, the invention can be otherwise practiced. That is, the solenoid 60, instead of being controlled by the temperature switch 26, can be energized or de-energized by a different pilot/control signal from a remote control device. Essentially, the solenoid 60 responds to a given signal, an enabling signal. Herein, the latter is temperature-generated. The invention, however, is susceptible of practice by any chosen enabling signal from whatever source. The invention can be utilized on any rotary, multi-turn, or quarter-turn valve which is manually operated, and which must be locked in either the opening or closing direction, or both, based on an incoming electrical signal. Too, an alternative practicality is to use a mechanical device, such as a bimetal or shape memory metal at the valve 10 to transform changes in temperature into mechanical motion which would engage and/or disengage the pawl 64 relative to the ratchet 56.

The mechanical and electrical components of the locking mechanism 24 are located in the housing 22 which defines a sealed enclosure, preventing ingress of dust and water, which, as embodied, meets Nema 4 requirements. Optionally, the housing materials can be selected so that the enclosure meets Nema 4X. The lone, required remote connection is that for one hundred and twenty volt a.c. power. The embodiment of the invention can be arranged to also accept direct current power from an external source, or from a battery with no external connections.

While we have described our invention in connection with a specific embodiment thereof, it is to be clearly understood that this is done only by way of example, and not as a limitation to the scope of the invention as set forth in the objects thereof, and in the appended claims.

We claim:

1. For a valve which has a rotary, operating assembly journaled in a housing, a temperature-responsive, locking mechanism, comprising:

an annulus coupled to said assembly for rotation therewith;

a fluid-temperature-operated, electric switch external of, and coupled to, said housing;

a solenoid mounted in said housing; and a source of electric power connected to said switch and said solenoid; wherein said switch is coupled to said solenoid for effecting solenoid operation; and locking means, coupled to said solenoid, and in proximity to said annulus, actable in response to solenoid operation, for engaging said annulus and preventing rotation of both said annulus and said assembly.

2. A temperature-responsive, locking mechanism, according to claim 1, wherein:

said rotary, operating assembly comprises a handwheel fastened to a threaded bushing, and a threaded spindle;

said bushing and said spindle are threadedly engaged to cause translation of said spindle in response to rotation of said handwheel and said bushing; and said annulus is coupled to said bushing.

3. A temperature-responsive, locking mechanism, according to claim 2, wherein:

said annulus comprises a ratchet; and said locking means comprises a pawl.

4. A temperature-responsive, locking mechanism, according to claim 3, further including:

means coupled to said housing and to said pawl for urging said pawl into engagement with said ratchet.

5. For a valve which has a rotary, operating assembly, a temperature-responsive, locking mechanism, comprising:

an annulus for coupling thereof to said assembly for rotation therewith;

a platform;

a solenoid mounted to said platform;

a fluid-temperature-operative, electric switch coupled to said solenoid for effecting solenoid operation;

a source of enabling electric power connected to said switch and to said solenoid; and locking means, coupled to said solenoid, and in proximity to said annulus, actable in response to solenoid operation, for engaging said annulus and preventing rotation of both said annulus and said assembly.

6. A temperature-responsive, locking mechanism, according to claim 5, wherein:

said rotary, operating assembly comprises (a) a handwheel, (b) a rotatable bushing to which said handwheel is fastened, and (c) a translatable spindle;

said bushing and spindle are threaded, and threadedly engaged to cause translation of said spindle in response to rotation of said handwheel and said bushing; and said annulus is coupled to said bushing.

7. A temperature-responsive, locking mechanism, according to claim 6, wherein:

said annulus comprises a ratchet; and said locking means comprises a pawl.

8. A temperature-responsive, locking mechanism, according to claim 7, further including:

means coupled to said platform and to said pawl for urging said pawl into engagement with said ratchet.

9. In combination with a fluid valve, a temperature-responsive, locking mechanism therefor, comprising:

a valve body having means formed therein for conducting fluid therethrough; wherein said body further has an opening formed therein; and means movable onto, and removable from, said opening, for obstructing and permitting fluid flow through said body, respectively; wherein said movable means comprises a flexible closure element;

a translatable spindle coupled to said element; wherein said spindle is threaded;

a rotatable, threaded bushing; wherein said spindle and bushing are threadedly engaged to cause translation of said spindle in response to rotation of said bushing;

a handwheel fastened to said bushing;

an annulus coupled to said bushing for rotation therewith;

a platform coupled to said body;

a solenoid mounted to said platform;

a fluid-temperature-operative, electric switch coupled to said solenoid for effecting solenoid operation;

a source of enabling electric power connected to said switch and to said solenoid; and locking means, coupled to said solenoid, and in proximity to said annulus, actable in response to solenoid operation, for engaging said annulus and preventing rotation of said bushing.

10. The combination, according to claim 9, wherein:

said annulus comprises a ratchet; and said locking means comprises a pawl pivotably mounted to said platform.

11. The combination, according to claim 10, further including:

means coupled to said platform and to said pawl for urging said pawl into engagement with said ratchet.

12. The combination, according to claim 9, further including:

a tee-shaped tube coupled to said body; and wherein said switch is mounted, intrusively, to said tube.

* * * * *